R. W. GILLISON 2,848,782

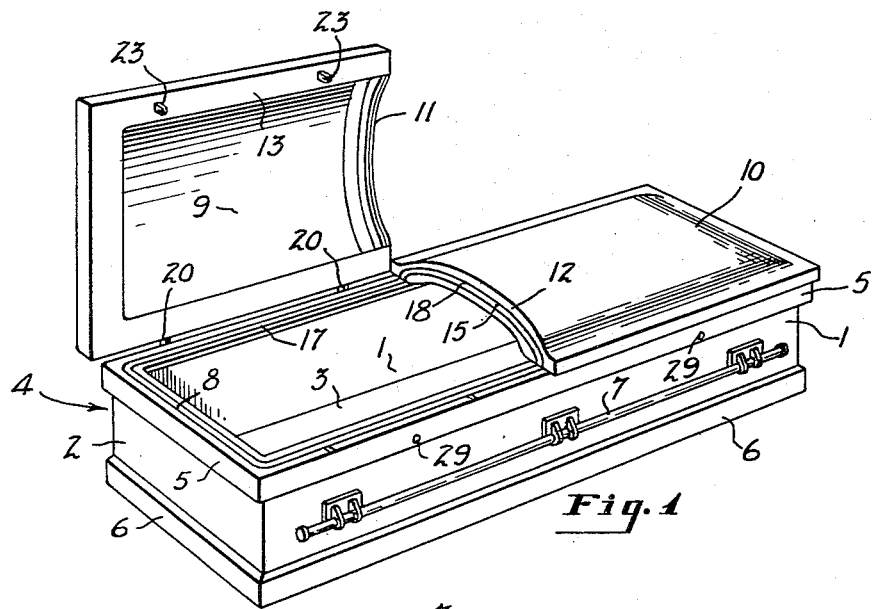
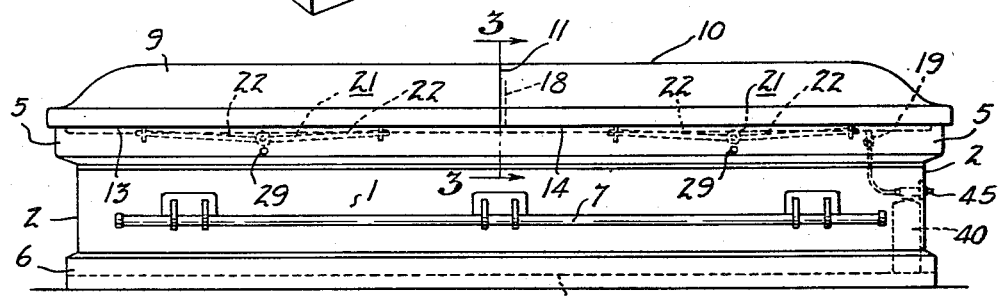
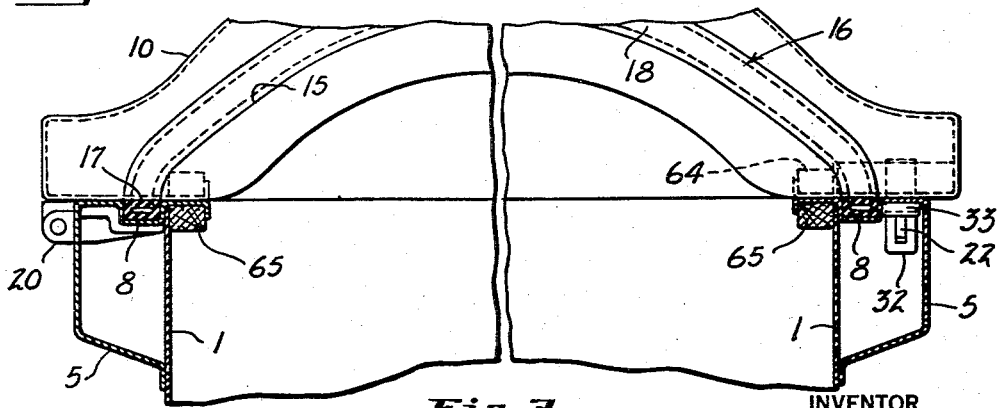
Fig. 1
Fig. 2
Fig. 3
INVENTOR
Robert W. Gillison
BY Evans + McCoy
ATTORNEYS Aug. 26, 1958

BURIAL CASKETS

Filed June 2, 1955

INVENTOR
*Robert W. Gillison*

BY *Evans + McCoy*
ATTORNEYS

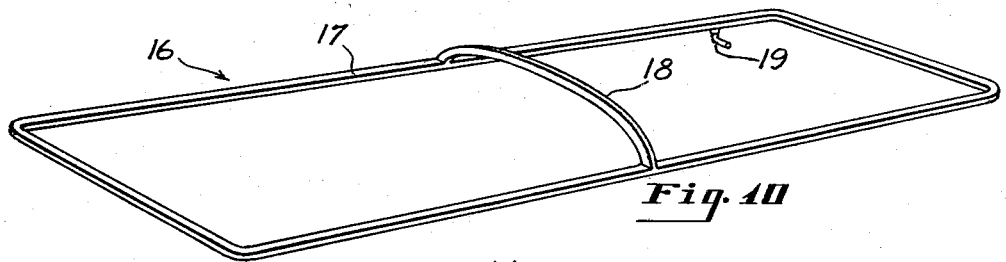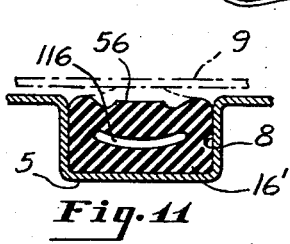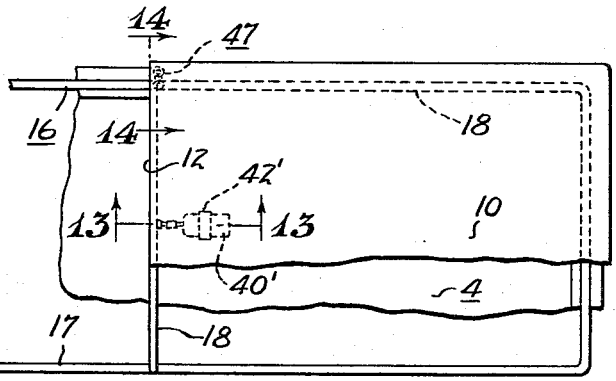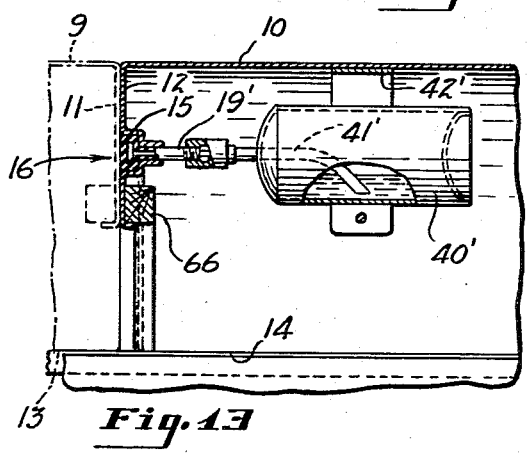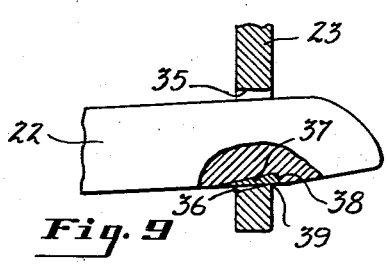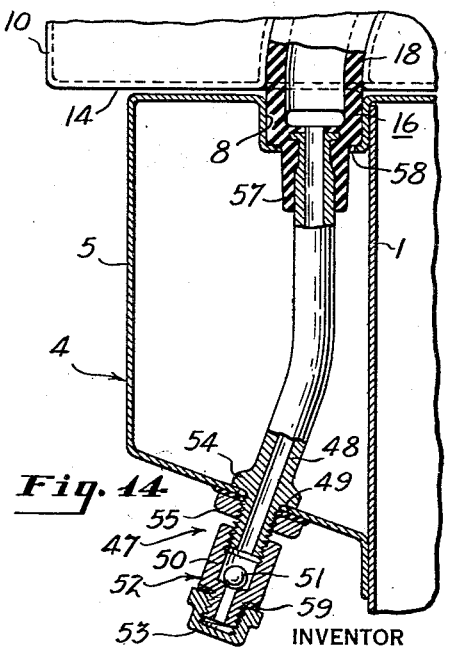

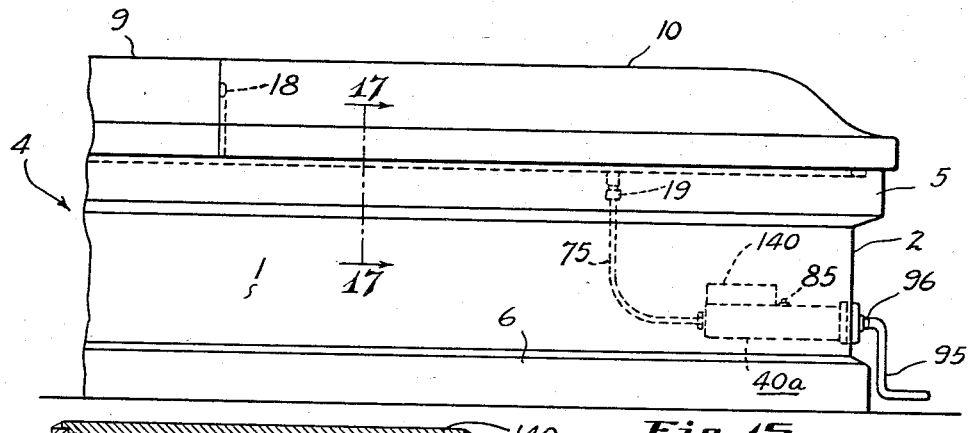
Fig. 15
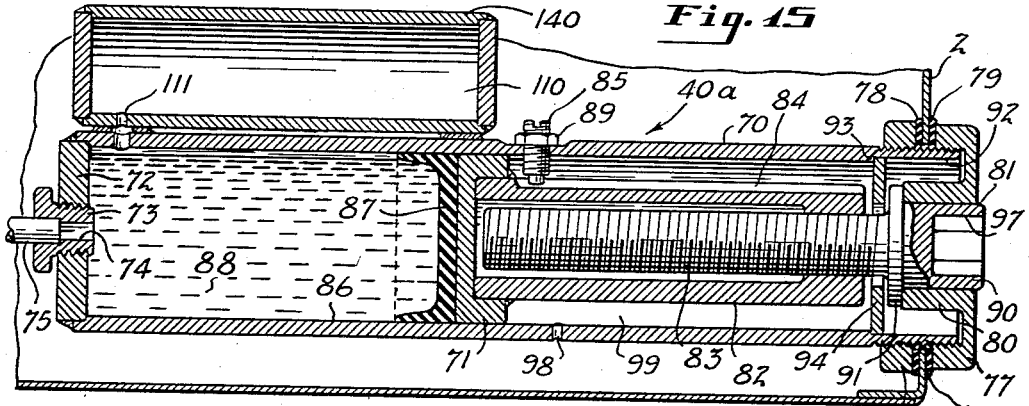
Fig. 16
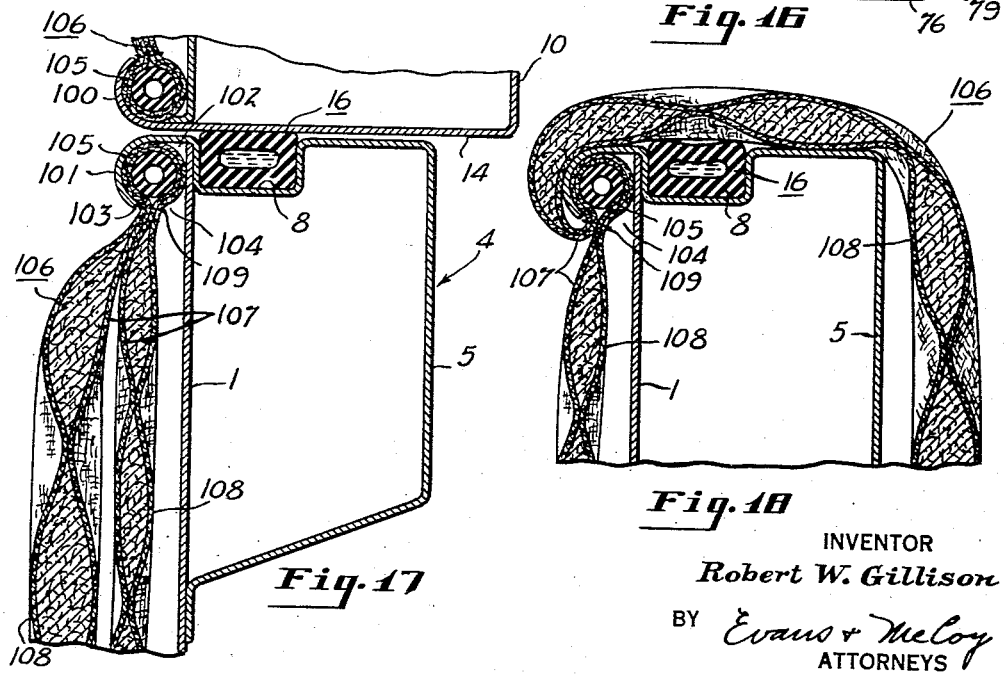
Fig. 17
Fig. 18
INVENTOR
Robert W. Gillison
BY Evans & McCoy
ATTORNEYS

United States Patent Office 2,848,782
Patented Aug. 26, 1958

2,848,782

BURIAL CASKETS

Robert W. Gillison, Rocky River, Ohio

Application June 2, 1955, Serial No. 512,728

11 Claims. (Cl. 27—17)

The present invention relates to a sealing means for burial caskets or the like and more particularly to a casket seal which may be inflated with a fluid under pressure.

This application is a continuation-in-part of my copending application Serial No. 438,968, filed June 24, 1954, and entitled Burial Caskets, now abandoned.

According to the present invention, a flexible dilatable and self-conforming sealing tube or gasket of substantially rectangular cross section is provided between the lid and main body portions of a casket or coffin to provide an airtight seal. Where a sectional lid is provided, a portion of the sealing tube is inserted between contiguous sections of the lid to prevent leakage of air or liquid therebetween whereby a corpse may be protected against the entry of air or foreign material into the coffin.

The sealing tube may be filled with fluid under pressure and dilated in any suitable manner so as to compress the top and bottom walls of the tube and provide an air-tight seal. Although air and other gases have the advantage of being compressible, it is preferable to fill the sealing tube with a self-sealing liquid. In order to maintain an effective seal for the maximum period of time, a pressure should be maintained on the liquid at all times. According to the present invention a pressurizable reservoir is provided in the casket that communicates with the interior of the sealing tube and that contains a suitable liquid. Any suitable means may be provided to apply a biasing pressure to the liquid in the reservoir so as to maintain a pressure on the liquid in the sealing tube, but it is often preferable to employ a compressed gas in the reservoir to maintain the needed pressure.

A releasable locking means may be provided for holding the casket lid in closed position and for permitting opening and closing of the lid before the casket is sealed. Such locking means preferably comprises reciprocable bolts which slide into and out of keepers. After the lid is closed and the bolts are moved to locking position, liquid under pressure may be applied to the sealing tube to seal the casket. The force resulting from the pressure tends to open the lid, but the bolts engage the keepers to limit the opening movement so that the sealing tube is compressed against the lid and the body of the casket to provide an air-tight seal.

In order to provide a theft-proof casket, it is often preferable to provide means to prevent opening of the casket after it is sealed under pressure. Any suitable means may be provided to prevent movement of the bolts out of the keepers or to prevent unlocking of the casket after pressure is applied to the liquid in the sealing tube to seal the casket, such means preferably being operable automatically in response to said pressure to lock the bolts in position. It is preferable to obtain such locking of the casket by designing the bolts and keepers so that liquid pressure in the sealing tube forces the keepers and the bolts together and prevents movement of the bolts out of the keepers. Such a result may be accomplished, for example, by providing the keepers with sharp edges for gripping the bolt or by providing the bolts with notches or soft portions that are deformable to receive the keepers.

Since it may be desirable to open the casket after it has been sealed, particularly if a corpse is shipped a long distance before the funeral, it is sometimes preferable to provide a pressurizing means for the sealing tube of the casket which can apply and release the pressure on the fluid in said tube. Such pressurizing means may, for example, be in the form of a reciprocable fluid pump in the casket that is operated by a handcrank or the like to increase or decrease the pressure on the fluid in the sealing tube.

A primary object of the present invention is to provide a simple and economical seal for effectively sealing a coffin or casket.

A further object of the invention is to provide a sealed casket which is theft-proof after sealing but which may be opened and closed before sealing.

A still further object of the invention is to provide a sealing tube or gasket which applies a uniform sealing pressure around the entire margin of a casket even where the abutting parts to be sealed are unevenly spaced.

Another object of the invention is to provide a convenient means for controlling the application of liquid pressure to a casket seal and for maintaining said pressure indefinitely.

A further object of the invention is to provide an improved means for attaching suitable decorations or upholstery to a casket.

Other objects, uses and advantages of the present invention will become apparent from the following description and from the drawings, in which:

Figure 1 is a perspective view on a reduced scale of a casket embodying the present invention;

Fig. 2 is a side elevational view on a larger scale of the casket shown in Fig. 1;

Fig. 3 is a fragmentary sectional view of the casket taken substantially on the line indicated at 3—3 in Fig. 2;

Fig. 9 is a fragmentary vertical sectional view of the bolt and keeper employed in the device of Fig. 4 on a larger scale and with parts broken away and shown in section;

Fig. 10 is a perspective view of the sealing tube employed in the casket of Figs. 1 to 8;

Fig. 11 is a fragmentary sectional view of a modified form of sealing tube which may be employed in a casket of the type shown in Figs. 1 to 8, the position of the tube when supplied with fluid under pressure being shown in dot-dash lines;

Fig. 12 is a fragmentary top plan view of a modified form of casket similar to the casket of Figs. 1 to 9 but having a different means to supply fluid to the sealing tube and to maintain pressure on the fluid, the sealing tube being shown substantially in its entirety;

Fig. 13 is a fragmentary vertical sectional view taken substantially on the line indicated at 13—13 in Fig. 12, one of the contiguous lids being shown in dotted lines;

Fig. 14 is a fragmentary vertical sectional view taken substantially on the line indicated at 14—14 in Fig. 12;

Fig. 15 is a fragmentary side elevational view with parts omitted of a modified form of casket similar to the casket of Figs. 1 to 9 but having a different means to supply fluid to the sealing tube and to maintain pressure on the fluid;

Fig. 16 is a fragmentary horizontal sectional view of the pressure supply means of Fig. 15 on a larger scale and with the handcrank removed;

Fig. 17 is a fragmentary vertical transverse sectional view taken substantially on the line indicated at 17—17 of Fig. 15 and on a larger scale; and Fig. 18 is a fragmentary vertical sectional view similar to Fig. 17 and showing how the upholstery may be draped over the sealing tube when the casket lid is opened.

Figure 4:
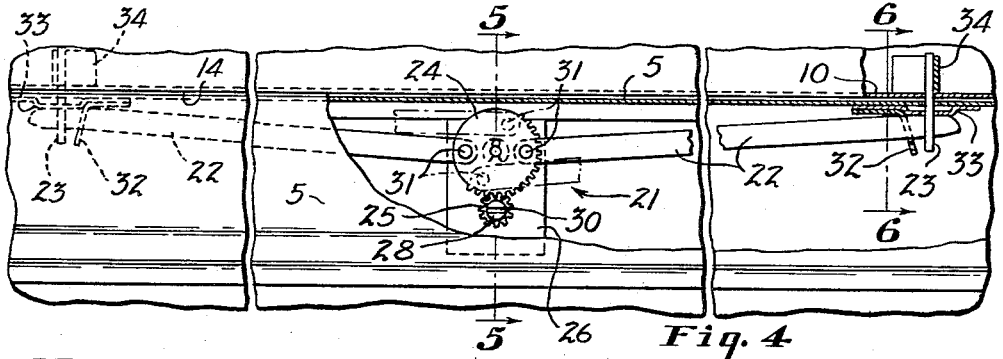
Fig. 4 is a fragmentary side view of the locking mechanism used in the casket shown in Figs. 1 to 3 but on a larger scale with parts broken away and shown in section, the position of the parts when the bolts are fully retracted being shown in dotted lines.
Figure 5:
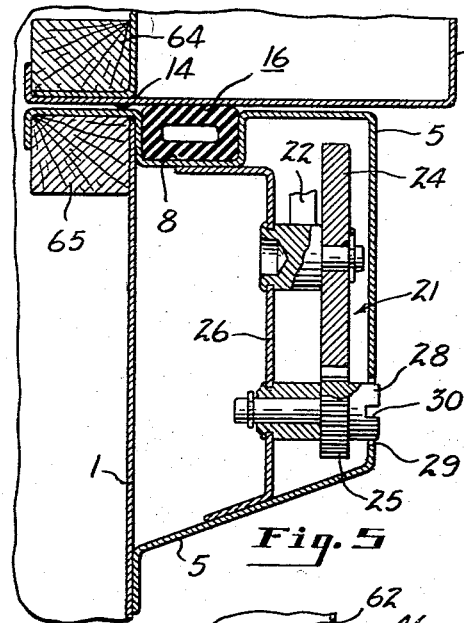
Fig. 5 is a fragmentary vertical section taken substantially on the line indicated at 5—5 in Fig. 4 and on a larger scale.

Referring more particularly to the drawings in which like parts are identified with the same numerals throughout the several views, Figs. 1 to 9 show a casket or coffin having upstanding side and end walls 1 and 2, respectively, and a bottom wall 3 forming an elongated rectangular receptacle for receiving a corpse. Said walls form the main body portion 4 of the casket which is shown herein as being constructed of sheet material. A hollow molding of sheet material is provided along the entire upper margin of the body portion in the form of peripheral channel members 5 which are rigidly connected to said side and end walls 1 and 2. If desired, a similar peripheral molding 6 may be provided at the bottom margin of the casket by forming the side and end walls so that the lower portions project outwardly. Rigidly connected to the side walls 1 on opposite sides of the casket are conventional lifting bars 7.

The upper portion of each molding member 5 is flush with the top of the body portion of the casket and is formed to provide a continuous recess preferably of substantially rectangular cross section in its top face. The recesses in the members 5 extend around the entire periphery of the casket to provide an endless marginal groove or channel 8 for receiving a sealing tube or gasket.

A one-piece lid or any other suitable lid may be provided for the casket, but as herein shown a sectional lid is employed having two independently movable closure members for sealing the casket. As shown, the casket is provided with two separately movable contiguous lids 9 and 10 of substantially identical construction. Each lid is preferably arched in cross section substantially as shown in Fig. 3; and, like the body portion 4 may be constructed of sheet material. The lids 9 and 10 have flat vertical abutting end faces 11 and 12, respectively, in engagement with each other and flat bottom marginal surfaces 13 and 14, respectively, which are adapted to closely overlie the flat marginal surface of the body portion 4 throughout its length. The vertical end face 12 of the lid 10 is provided with an arched groove or channel 15 which, as herein shown, has substantially the same width and depth as the marginal channel 8 and which registers at its opposite ends with said last-named channel when the lid 10 is closed.

The channels 8 and 15 provide recesses or grooves for receiving a continuous flexible and dilatable sealing tube 16 as best shown in Fig. 10. The tube is preferably endless and comprises a substantially rectangular marginal portion 17 of a size to fit the channel 8 and an arched integral intermediate portion 18 of a size to fit the channel 15. Each of said portions is hollow throughout its length to provide a fluid passage and is preferably formed of a suitable plastic or a durable rubber-like material, which can hold a liquid under pressure indefinitely. The interior of the intermediate portion 18 communicates at its opposite ends with the interior of the marginal portion 17 so as to receive fluid therefrom. Fluid is supplied to all portions of the sealing tube through an inlet connection 19 placed in any suitable or convenient location. The connection 19 may project through the side or bottom of the chanel 8. It will be understood that the intermediate portion 18 will be omitted when a one-piece lid is employed.

The lids 9 and 10 may be hinged to one side of the body portion 4 in a conventional manner and may be detachably secured to the opposite side of said body portion by a suitable locking means or the like so that the lids are held in closed position when fluid under pressure is forced into the sealing tube 16. As herein shown, each of the abutting lids is pivotally connected to the rear of the body portion 4 by hinges 20 and is adapted to be held in closed position by a key-operated locking mechanism 21 located within a longitudinal molding member 5 on the front side of the casket. Each of the locking mechanisms 21 is shown in closed position in Fig. 4 and comprises a pair of locking bolts 22 which are moved in opposite directions into and out of a pair of keepers 23 by means of a key-operated actuating mechanism including a spur gear 24 and a pinion 25 having teeth meshing with the teeth of said gear. Each gear and pinion is supported inside the molding member 5 by a U-shaped upright supporting member 26 and is mounted for rotation about fixed parallel axes perpendicular to the side walls 1. The opposite ends of the supporting member are rigidly secured to the molding member 5 by welding or in any other suitable manner. The pinion 25 is provided with an integral stub shaft 28 having an end which projects through a circular opening 29 in the molding member 5. The end of said shaft is provided with a slot 30 which receives a key for rotating the gear 24.

Each pair of bolts 22 is pivotally connected to one of the gears 24 by a pair of cylindrical pins 31 which are received in a pair of diametrically-opposed cylindrical holes in the gear. The outer end of each locking bolt is directed toward a keeper 23 by a guide member 32 which is rigidly connected to the top horizontal portion of the molding member 5 adjacent a keeper 23. Each guide member is positioned between the keeper and the spur gear to support its associated bolt in alinement with a bolt-receiving opening in the keeper when the bolt is fully retracted out of the keeper.

As herein shown, a plate or strap 33 is interposed between the attaching portion of each guide member 32 and the molding member 5. Each strap is rigidly connected to the molding member and has an intermediate portion which is engageable with the top surface of a bolt 22 to limit upward movement thereof. Said intermediate portion is provided with a slot for receiving the keeper and for holding the keeper in alinement with its associated bolt.

Each keeper 23 is attached to one of the lids 9 and 10 in any suitable manner and projects downwardly through small openings in the lid and the molding of the casket to the bolt. As herein shown, the keepers of each lid are welded in vertical position to U-shaped attaching members 34 which are rigidly connected at their opposite ends to the interior and exterior portions of the lids. The openings in the lid through which the keepers project are completely sealed by welding or in any other leak-proof manner so that air cannot leak into the casket through openings around the keepers.

The four keepers 23 are provided with slots or openings 35 shaped to receive the locking bars or bolts 22. Each opening 35 has a bottom surface 36 which is engageable with the bottom surface of a bolt 22 to limit upward movement of the lid and downward movement of the bolt when the casket is closed.

When the sealing tube 16 is collapsed and the lids 9 and 10 are fully closed and in engagement with the flat upper surfaces of the molding members 5, the bolt engaging surface 36 of each keeper is spaced from the bottom bolt-engaging surface of a strap 33 a distance slightly greater than the maximum height of the portion of the bolt engaging said surfaces so that sufficient clearance is provided to move the bolt into and out of the keeper by rotating the pinion 25 and the gear 24. This clearance is very small but sufficient to permit locking of the lids in closed position and unlocking thereof before the casket is sealed. It will be understood that the bolt and keeper may be designed to minimize the clearance necessary for proper functioning of the casket.

When the casket is sealed by applying liquid or other fluid under pressure to the sealing tube 16, the lids are moved slightly upward until the four bolts 22 are wedged between the straps 33 and the surfaces 36 of the keepers 23. The original clearance provided to permit locking and unlocking of the casket therefore results in a similar clearance between the bottom of the lids and the top of the casket body when the casket is sealed as shown in Fig. 6.

Figure 6:
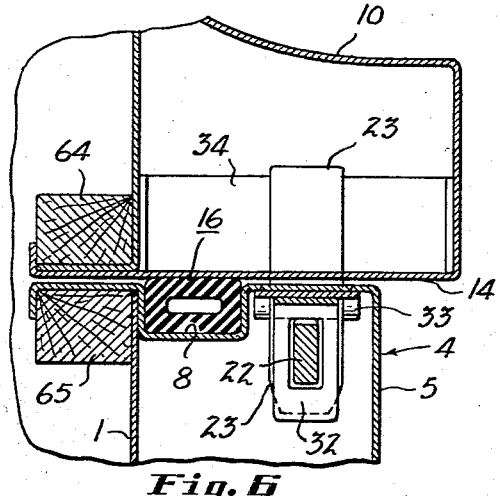
Fig. 6 is a fragmentary vertical sectional view taken substantially on the line indicated at 6—6 in Fig. 4 and on the same scale as Fig. 5.

As shown in Fig. 6, the sealing tube 16 is substantially rectangular in cross section when subjected to liquid pressure and forced into sealing engagement with the lid and body portions of the casket. The top wall of the tube has a thickness throughout its length preferably several times the maximum clearance between the lids and the body portion of the casket so that the tube walls are under compression when the casket is sealed. Compression of the rubber-like material of the sealing tube assists in preventing leakage of fluid through the pores of the tube. As herein shown the sealing tube is shaped so that it conforms to the channels 8 and 15 and sealingly engages the bottoms of said channels throughout their lengths when the casket is sealed. As herein shown, a large area of contact is provided between the sealing tube and the lids and between said tube and the channels therefor so as to insure a good seal.

It will be understood that the sealing tube may have a cross-sectional shape when pressurized substantially as shown in Fig. 6 throughout its length. It will be noted that a tube of rectangular cross section tends to become circular when the tube is pressurized internally but that a circular cross section is not attained since the bolts and keepers limit upward movement of the lids and prevent the height of the sealing tube from approaching the diameter of such a circular section.

It will also be noted that the fluid in the sealing tube applies a uniform pressure to all surfaces engaging the tube even where the clearances between the casket body and the lid or between the lids are unequal. If necessary the tube can dilate more at one corner of a lid than at another so as to provide an effective seal where the clearances are non-uniform.

Since the bolts are tightly wedged between the straps 33 and the surfaces 36 of the keepers 23 when the casket is sealed under pressure, a large force is required to slide the bolts out of locking position so as to open the lids 9 and 10. It may be preferable to make the casket theft-proof so that it cannot be opened after it is sealed, but it may at the same time be preferable to construct the bolts and keepers and the other parts of the locking mechanisms 21 so that the casket can be locked and unlocked before the casket is sealed.

One method of permanently locking the casket is to render the actuating mechanism for the bolts inoperative after the casket is sealed or in response to the application of pressure to the sealing tube. As herein shown, the shafts 28 and/or the pinions 25 are made of a frangible material or a soft deformable metal such as lead and are constructed so that they can apply sufficient force to rotate the spur gear and move the bolts out of the keepers before liquid under pressure is applied to the sealing tube or gasket but are unable to perform such actions when the bolts are wedged against the keepers by the pressure of said liquid.

In order to insure that the spur gears cannot be rotated by inserting keys into the slots 30 after the casket is sealed, it is preferable to provide means to catch or grip the bolts and to prevent movement of the bolts out of the keepers while pressure is maintained on the sealing tube. As herein shown, a notch 37 is provided in the bottom portion of each bolt which engages the keeper. Such notch may have a depth less than the clearance provided for the bolt before sealing of the casket so as to permit opening of the casket before sealing or may be filled with a soft deformable material, such as lead or the like, to prevent the keeper from catching on the edge of the notch before the casket is sealed. As herein shown, each notch 37 is filled with a soft material 38 which is not deformed by the weight of a bolt or by the normal forces exerted by the keeper against the surface before sealing of the casket.

The material 38 provides each bolt 22 with a smooth lower surface to permit sliding of the bolt into and out of the keeper, but when the sealing tube 16 is pressurized to seal the casket this material may be deformed by the surface 36 of the keeper so that the keeper enters the notch 37. Thereafter the bolts cannot be moved out of the keepers by the pinions 25 or the spur gears 24 and the lids cannot be opened.

If desired, the keepers 23 or the straps 33 may be provided with sharp projections or sharp edges which dig into the bolts 22 when the casket is sealed under pressure. As herein shown, the surfaces 36 at the bottom of the bolt receiving openings in the keepers are inclined to provide sharp edges 39 for deforming the soft lead or other material in the notches 37 in response to the application of liquid under pressure to the sealing tube 16.

Suitable means is provided to supply liquid to the sealing tube and to maintain a pressure on the liquid indefinitely. Such means may include an energy-storing device, such as an accumulator. As herein shown this pressure is maintained by means of an accumulator in the form of a pressurizable tank or reservoir 40 which is partially filled with liquid and which contains a gas trapped above the liquid. The gas is compressed in the reservoir and is adapted to expand so as to maintain the pressure needed for a permanent and effective seal. A liquid conduit 41 has an open end located in the liquid in the reservoir 40 and communicates with the interior of the sealing tube 16 to supply fluid under pressure to the portions 17 and 18 of the sealing tube.

The reservoir 40 and the conduit 41 may be located in any convenient location within the casket and may be connected to the sealing tube at any suitable location. However, it is usually preferable to provide the liquid pressurizing apparatus with valve means which can be readily operated manually to initiate automatic dilation of the sealing tube and automatic sealing of the casket so that the casket may be sealed with minimum effort and in a minimum time.

In the embodiment of the invention shown in Figs. 1 to 10, the reservoir 40 rests on the bottom wall 3 of the casket and is held in fixed position against an end wall 2 by a clamp 42 with the upper end thereof near the inlet connection 19 of the sealing tube. The conduit 41 is held in vertical position in the tank 40 with its lower end well below the lowermost level of the liquid and is connected at its upper end to the inlet end of a manually-operated leak-proof shut-off valve 43. Connected to the outlet of the valve is a short flexible conduit 44 preferably of small internal volume which is connected at its upper end to the inlet 19 to convey liquid flowing through the valve from the tank 40 to the sealing tube 16. The valve is opened and closed by means of an actuating rod or member 45 which projects through an opening 46 in the end wall 2 so as to be accessible from outside the casket. Leakage of fluid between the body of the valve 43 and the actuating member 45 is prevented by suitable sealing means including a packing nut 60.

Any suitable means may be provided to prevent leakage of air through the opening 46 to the interior of the casket. As herein shown, the body of the valve 43 is provided with an integral flange 61 having a diameter greater than that of the opening 46. Leakage between the flange and the casket wall through the opening 46 may be prevented by welding the entire marginal portion of the flange to the wall or by employing a suitable sealing ring between the flange and the wall. As herein shown, a permanently airtight seal is provided by inserting a flat sealing ring 62 between the flange 61 and the end wall 2 and drawing the flange into sealing engagement with the ring by means of bolts or screws 63. The casket itself may be made airtight by welding all of the seams throughout their lengths or in any other suitable manner.

Figure 8:
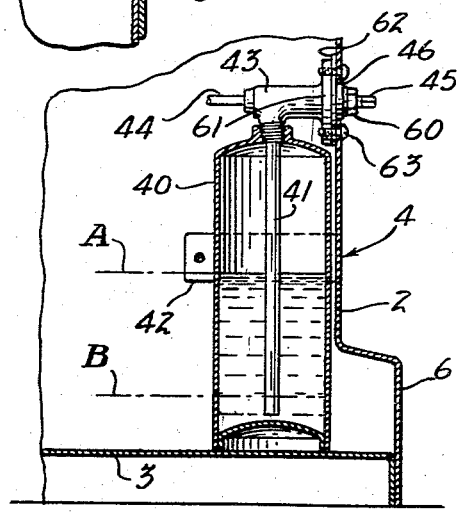
Fig. 8 is a fragmentary vertical sectional view taken substantially on the line indicated at 8—8 in Fig. 7.
Figure 7:
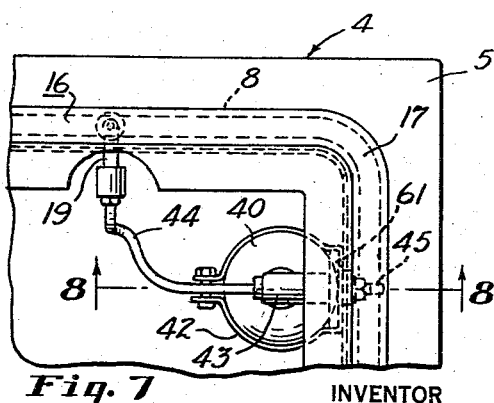
Fig. 7 is a fragmentary top view of the main body portion of the casket shown in Figs. 1 to 6.

The tank 40 is originally filled with liquid up to level A as shown in dot-dash lines in Fig. 8 and the gas above the liquid is compressed to a predetermined initial pressure at which time the valve 43 is closed so as to maintain said initial pressure and to prevent leakage out of the tank. A vacuum pump is connected to the inlet 19 of the sealing tube to collapse the tube and to remove substantially all air from the sealing tube whereby a vacuum is produced. Then the conduit 44 is connected to the inlet 19 while the vacuum is maintained so that an air-tight connection is made between the sealing tube 16 and the tank 40. Thereafter, whenever it is desired to seal the casket the lids are locked closed and the actuating member 45 is rotated by hand or a suitable tool to open the valve 43. As soon as communication is established between the tank 40 and the sealing tube by opening the valve, the sealing tube is filled and dilated with fluid under pressure and the casket is sealed automatically. Upon sealing the casket the liquid in the tank falls to a lower level B as shown in dot-dash lines in Fig. 8. The initial pressure of the gas is sufficient so that the required pressure is obtained on the liquid after expansion of the gas in the tank and the original volume of liquid is predetermined so as to be sufficient to fill and dilate the sealing tube and to apply the desired pressure for sealing the casket. Since the air is removed from the sealing tube before it is filled with liquid, it is possible to determine the volumetric capacity of the tube and the amount of liquid originally required in the tank 40 sufficiently accurately so that the amount of gas expansion and the fall in liquid levels during expansion may be predetermined.

Figure 11 shows a modified form of sealing tube 16' which may be used in the casket of Figs. 1 to 9. The tube 16' may be exactly the same as that shown in Fig. 10 but any cross section thereof would appear substantially as shown in solid lines in Fig. 11 before liquid under pressure is supplied thereto. Like the tube 16, the sealing tube 16' is shaped to sealingly engage the bottom wall of the endless channel 8 throughout the length thereof. When the tube 16' is supplied with liquid under pressure, the top portion thereof moves upwardly into sealing engagement with the lid as shown in dot-dash lines in Fig. 11. Unlike the sealing tube 16, the tube 16' is provided with at least one endless or continuous rib 56 which engages the lids throughout the margin of the casket. The width of the rib 56 throughout its length is less than that of the sealing tube 16' and preferably less than that of the internal passage therein so that the pressure per unit area between each lid and the sealing tube is greater than that of the liquid in the tube. By providing ribs on one or more faces of the sealing tube and reducing the area of the sealing tube in engagement with the casket, it is possible to obtain higher sealing pressure with lower liquid pressure in the tube and, therefore, to obtain an effective seal with low liquid pressure.

The liquid-receiving cavity or passage in the sealing tube or gasket is preferably so disposed that the rubber of the tube is not subjected to any tensile stresses when the gasket is dilated to seal the casket. As shown in solid lines in Fig. 11, the sealing tubes 16' in the normal unstressed condition prior to sealing of the casket has an internal cavity or passage 116 of substantially arcuate cross section disposed with its concave side up. When fluid under pressure is supplied to the passage 116, the ratio of its width to its height is decreased and the top portion of the sealing tube 16' above said passage is moved away from the channel 8 toward the casket lid. The toggle-like action during straightening of said top portion presses the sealing tube against the sides of the channel 8 and tends to increase the width of the passage 116. Before said passage decreases in width, said top portion must be bowed upwardly a substantial distance. As shown in dot-dash lines in Fig. 2, the clearance between the casket lid and the casket body is small enough so that, after sealing tube 16' is dilated and subjected to the desired sealing pressure and after the top portion of the tube is in sealing engagement with the lid, all portions of the tube are under compression and no portion is subjected to tensile stresses which might hasten deterioration of the sealing tube or failure of the seal.

Figs. 12 to 14 show a modified form of casket which is substantially identical with that employed in the first-described embodiment except for the mechanism used to supply liquid to the sealing tube and to maintain said pressure. In this embodiment of the invention an accumulator in the form of a tank or reservoir 40' is supported in horizontal position inside the lid 10 by a clamp 42' which is rigidly connected to the uppermost central portion of the lid near the channel 15 and the face 12 as shown in Fig. 12. Like the tank 40, the tank 40' is adapted to contain a liquid and a gas trapped or compressed above said liquid for maintaining a pressure on the liquid. A liquid conduit 41' has one end opening to the tank below the surface of the liquid and its opposite end connected to a connection 19' similar to the connection 19. Said inlet connection communicates directly with the uppermost central portion of the sealing tube preferably substantially at the center of the arched portion 18 so that gas or liquid may flow from the top of the sealing tube into the tank 40'.

In order to provide the pressure required to seal the casket properly, air under pressure may be supplied to the top of the tank 40' or liquid under pressure may be supplied to the sealing tube 16 so as to compress the air already in the tank 40'. It is preferable to provide suitable means for supplying liquid under pressure to the sealing tube so that any air in the tube may be removed therefrom and forced into the reservoir 40' when the casket is sealed.

As herein shown, the sealing tube 16 of Figs. 11 to 14 is provided with an air-tight inlet connection 47 which comprises an inlet conduit 48 having an externally threaded end which projects through an opening 49 in the bottom portion of a molding member 5. The externally threaded end is screwed into an internally threaded valve body 50 which cooperates with a ball 51 to form a non-return valve or check valve 52 accessible from outside the casket. The outermost end of the valve body is threaded to receive a cap 53 and a sealing ring 59 which seals the inlet connection 47 indefinitely and prevents any leakage of fluid into or out of the sealing tube. The conduit 48 is provided with a shoulder 54 for engagement with the margin of the opening 49 and is held in fixed position by means of a nut 55 which is screwed onto the threaded end of the conduit between the shoulder 54 and the check valve 52.

It will be understood that the walls of the casket body shown herein are imperforate and are welded to the upper portions of the members 5 or otherwise sealed throughout their lengths to prevent any leakage from inside the marginal chamber formed by the molding members 5 to the interior of the casket. By sealing this marginal chamber, any air which may leak into said chamber through the key openings 29 or the opening 49 is prevented from entering the casket interior. However, it will be understood that the openings 29 and 49 may be sealed in any suitable manner to prevent leakage of air into the molding members 5.

As herein shown, the inlet conduit 48 is connected to the sealing tube 16 below the junction of the rectangular portion 17 and the arched portion 18. The sealing tube has a substantially cylindrical portion 57 which projects through a circular opening 58 in the bottom of the channel 8 and which receives the upper end of the conduit 48. The tube engages the marginal portion of the opening 58 to provide an air-tight seal and is bonded or otherwise connected to the conduit 48 so that an effective seal is provided which will maintain liquid in the tube 16 indefinitely.

When it is desired to seal the casket of Figs. 12 to 14, the cap 53 is removed and a suitable liquid under pressure is supplied through the inlet connection 47 to the sealing tube 16 in any suitable manner. Any gas in the tube, being lighter than the liquid being supplied thereto, will rise to the top of the intermediate portion 18 and will be forced by the liquid into the reservoir 40' as the tube is filled with liquid. The liquid is supplied until the liquid level within the reservoir 40' is above the open end of the conduit 41' and the gas above the liquid is compressed to the desired pressure. The pressure is predetermined and is sufficient to maintain an effective seal. The supply of liquid is then discontinued and the cap 53 is replaced. The check valve 51 prevents loss of liquid while the cap is being screwed onto the valve body 50. The cap is rotated sufficiently to force the sealing ring 59 tightly against the valve body and to provide a leakproof connection.

The expansion tank 40' is adapted to receive the air or other gases in the sealing tube 16 before sealing of the casket and eliminates the need for using a vacuum pump or for using a valve to maintain a vacuum in the sealing tube until the casket is sealed. When liquid under pressure is supplied to the sealing tube, any air in the tube will be forced into the expansion tank. It will be understood that the expansion tank 40' may be employed in the casket of Figs. 1 to 9 along with the tank 40, in which case the use of a vacuum pump would be unnecessary and the tank 49' would be connected to the upper part of the intermediate portion 18 to receive the air in the sealing tube. The tank 40' may be located in the lid and connected to the sealing tube 16 of Figs. 1 to 10 substantially in the same manner as shown in Fig. 13.

The sealing tubes described above may be made of any suitable flexible and deformable plastic material but are preferably made of a pliable or rubber-like material which will maintain its pliability indefinitely. A silicone rubber composed substantially entirely of dimethylsilicon-oxygen linkages or other diorganyl-silicon-oxygen linkages would be preferred, but a sealing tube made of neoprene or butyl rubber would also give good results.

Any suitable liquid may be employed in the sealing tube 16 or 16'. However, it is usually desirable to employ a liquid having a freezing point lower than that of water and preferably containing a suitable self-sealing compound. Glycerine, various vegetable oils, and other liquids which will not react with or dissolve the material of the sealing tube would be suitable.

The gas employed in the reservoir 40 or 40' may be air, nitrogen, freon or any other suitable gas which is relatively inert or compatible with the liquid employed in the sealing tube or may be a mixture of gas so long as it is capable of maintaining a pressure on the liquid for an indefinite period of time.

The sealing tube 16 is readily removable from the channels 8 and 15 so that it can be readily lifted out of the way and hung on the opened lids while a body is being placed in the casket.

The reservoir 40' is connected by a detachable union to the cross member 18 of the sealing tube and may be connected to the member 18 after the lid 10 is closed.

It will be understood that the sealing tube of the present invention does not substantially interfere with conventional interior decorations which would be tacked to the casket. Such decorations or upholstery are not illustrated in Figs. 5 and 6 of the drawings, but the wooden portions of the casket to which they are tacked are shown. As shown herein the casket has suitable flanges around its periphery for receiving wooden strips 64 and 65 to which the upholstery is attached. The abutting portions of the lids 9 and 10 are formed with arched flanges for receiving arched strips 66 which serve the same purpose.

Figures 15 to 18 show a casket which is identical with the casket of Figs. 1 to 9 but has a modified form of pressure supply means for supplying liquid to the sealing tube 16 and has different means for attaching the upholstery to the casket. Unlike the first described casket, the casket of Figs. 15 to 18 may be opened after sealing pressure has been applied to the tube 16.

It is often desirable to provide a casket which may be sealed for purposes of shipping a corpse or to prevent odors from leaving the casket and which may be opened thereafter for a funeral service or for other reasons. Where the casket must be opened the casket of Figs. 1 to 9 is unsuitable since it is not intended to be opened after it has once been sealed. In order to permit opening of the casket after sealing, the means for supplying pressure to the liquid or other fluid in the sealing tube should be capable of reducing the pressure in said tube at any time. The pressure supply means may be a hydraulic pump or any other suitable source of fluid under pressure which may be operated by means accessible from outside the casket. For example, the pressure supply means may be a hydraulic pump having a piston rod which may be moved by a tool or other suitable means from outside of the casket.

As best shown in Figs. 15 and 16, the sealing tube 16 is connected to a pressurizable reservoir 40a in the form of a hydraulic pump having a cylinder 70, a piston 71 slidably mounted therein, and an expansion tank 140 in fluid communication with the interior of said cylinder. The end of the cylinder is closed by an annular disc 72 which is internally threaded to receive an annular fitting 73 having an axial bore 74. The inlet connection 19 of the sealing tube 16 is connected to one end of a copper tube 75 extending between the sealing tube and the pressurizable reservoir. As herein shown, the other end of the tube 75 is connected to the fitting 73 and is brazed thereto to form an airtight connection. The cylinder 70 projects through a circular opening in the end wall 2 and is externally threaded near said end wall to receive internally and external metal sealing collars 76 and 77 which are internally threaded to screw onto said cylinder. Annular sealing washers 78 and 79 of a suitable elastic rubber-like material are provided on opposite sides of the wall 2 at the margin of the circular opening in said end wall for preventing leakage of air around the cylinder 70 into or out of the casket. The collars 76 and 77 may be screwed towards each other to compress said washers tightly against said end wall to provide an effective seal. The outer collar 77 is provided with an annular hub portion 80 coaxial with the cylinder 70 and projecting axially into the end of said cylinder. Said hub portion is provided with a cylindrical bore which provides a bearing for a screw 81 that projects axially into the cylinder 70. The piston 71 is welded to a tubular piston rod 82 coaxial with the cylinder 70 and extending from the piston rod toward the collar 77. The outer end portion of the piston rod is internally threaded to fit the externally threaded portion 83 of the screw 81 so that the piston may be moved axially when the screw is rotated. Any suitable means may be provided to prevent rotation of the piston rod with the screw. As herein shown, the piston rod is provided with an axial slot 84 and the cylinder 70 is drilled and tapped to receive a radial screw 85 which projects into said slot to prevent rotation of the piston. A locking nut 89 is provided for preventing rotation of the screw.

Forwardly of the radial screw 85 the cylinder 70 has a cylindrical bore 86 of circular cross section in which the piston reciprocates. A cup-shaped rubber-like piston seal 87 is provided on the front face of the piston 71 to prevent leakage of liquid from the chamber 88 at the front end of the seal around the circumference of the piston. The piston and the piston seal have external cylindrical surfaces with a diameter substantially the same as that of the bore 86 so that there is a minimum clearance, and leakage from the cylinder is effectively prevented.

The screw 81 has an integral externally cylindrical head 90 mounted for rotation in a cylindrical bore in the hub 80 that is concentric to the cylinder 70 and has an integral annular flange 91 with a diameter greater than that of said bore which provides a shoulder for engaging the hub portion 80 to limit movement of the screw axially away from the chamber 88. The cylinder 70 is provided with an axial bore 92 extending from the rear end of the cylinder to an annular shoulder 93 beyond the front surface of the flange 91. An annular stop-plate 94 with an external diameter to fit in the bore 92 and an internal diameter less than the external diameter of the flange 91 is mounted in said bore against the shoulder 93 to limit movement of the screw 81 axially toward the chamber 88.

The axial actuating screw 81 may be rotated in either direction by a suitable tool or in any other suitable manner to cause axial movement of the piston 71 toward or away from the chamber 88 so as to increase or decrease the volume of said chamber. As herein shown, the actuating screw is rotated by means of a handcrank having a hexagonal portion 96 engageable with the head 90 of the actuating screw. The head 90 is provided with a hexagonal recess 97 of a size to receive the crank portion 96 so that the screw may readily be rotated in either direction by inserting said crank portion into said recess and rotating the handcrank manually. An air vent 98 may be provided in the cylinder 70 to permit the flow of air into and out of the annular chamber 99 at the rear of the piston 71 when the screw is rotated to move said piston.

The hydraulic pump 40a may have exactly the same relative size and shape as shown in Fig. 16, which is drawn to scale, but it will be understood that equivalent pumps of different shape which function in a substantially different manner may also be suitable including rotary pumps, sylphon or bellows-type pumps, or the like.

As herein shown, the expansible chamber 88 of the hydraulic pump communicates with a closed chamber 110 of the expansion tank 140 through a port or opening 111 at the top of the cylinder 70. The expansion tank is welded to the cylinder of the pump so as to provide an air-tight connection between the tank and the cylinder. The chamber 110 contains air or other suitable gas which is compressed when the piston 71 is advanced to seal the casket, the chamber 88 containing sufficient liquid at all times to prevent the entry of air into the tube 75 from the expansion tank.

If desired the expansion tank 140 may be omitted and an expansion tank of the type shown at 40′ in Figs. 12 and 13 may be employed to receive any air which may remain in the sealing tube 16. Where the tank 40′ is not employed to remove air from the sealing tube, substantially all of the air in the tube may be removed before the tube is connected to the pressurizable reservoir 40a.

In the casket shown herein, air-tight connections are provided at 19 and 73 so that liquid may flow from the chamber 88 of the hydraulic pump to the sealing tube 16 and so that a sealing pressure may be maintained indefinitely on said liquid to maintain an effective casket seal. Before the pump is connected to the sealing tube 16 at one of the connections 19 and 73, the sealing tube is filled with liquid at atmospheric pressure to remove substantially all of the air from the tube. A vacuum pump may be employed for this purpose, but good results can usually be obtained by filling the tube with liquid under atmospheric pressure in such a way as to force the air out of the tube. The chamber 110 of the expansion tank is filled with air at atmospheric pressure and the chamber 88 and the tube 75 are filled with liquid at atmospheric pressure to exclude air from the tube 75 before the sealing tube 16 is connected to the pump chamber 88. After assembly the amount of air in the system is negligible. Since the liquid level in the reservoir 40a is substantially above the connection 73 and is adjacent the port 111 when the piston 71 is in its normal retracted position, air cannot pass from the chamber 110 to the tube 75 even when the piston is fully retracted, and the air is trapped in said chamber and compressed when the piston is advanced. After sealing of the casket the compressed air in the expansion tank 140 maintains pressure on the liquid in the chamber 88 and in the sealing tube 16 under varying temperatures and permits changes in the volume or weight of liquid in the sealing tube which may occur due to temperature changes, distortion of the casket during handling, variation in the clearances between the casket body and casket lid, or other causes. Since a substantial pressure on the sealing tube 16 can force liquid out of the tube toward the reservoir 40a and further compress the gas in the expansion tank 140, the sealing tube can act as a safety valve means to prevent the buildup of dangerously high pressure in the casket due to fermentation or the like which might push out the sides of the casket. By preselecting the volume of liquid and air and the displacement of the pump, a predetermined pressure may be applied to the sealing tube or gasket 16 when the casket is sealed. So long as the pressure in the casket remains below said predetermined pressure, the sealing tube will maintain an effective seal, and when the pressure exceeds said predetermined pressure the tube will deform and relieve the excessive pressure. The compressed gas in the expansion tank maintains the pressure on the liquid in the tube so that an air-tight seal is again effected after the excessive pressure in the casket is relieved.

It will be apparent that the pressurized reservoirs 40 and 40′ function like the reservoir 40a and its expansion tank 140 as yieldable means to maintain the pressure on the liquid in the sealing tube while permitting changes in the liquid volume in said tube. Because of the yieldable pressurizing means an effective seal can be maintained indefinitely, and it is unnecessary to stretch the rubber-like material of the sealing tube to maintain the pressure on the incompressible liquid in said tube. It is preferable to place the sealing tube under radial compression when the casket is sealed to prevent deterioration of the tube which may be caused by stretching and to prevent leakage of the liquid from the tube. An expansion tank or other yieldable means permits a casket design wherein the sealing tube 16 is not subjected to any tensile stresses sufficient to stretch the tube material.

It will be apparent how the screw 81 may be rotated to increase or decrease the pressure on the liquid in the sealing tube 16. When the handcrank is placed in the recess 97 and is rotated in one direction, the flange 91 thrusts against the hub 90 and the threads of the portion 83 mesh with those of the piston rod 82 to advance said rod toward the chamber 88. If the handcrank is rotated in the opposite direction, the flange 91 thrusts against the stop-plate 94 and the meshing screw threads retract the piston rod. After the handcrank is removed from the recess 97, the friction between the threads of the screw 81 and the piston rod holds the piston 71 in its adjusted position until the screw 81 is again rotated. A good sealing pressure may be maintained for an indefinite period of time after the piston 71 has been advanced to seal the casket or the pressure may be removed at any time by rotating the handcrank to retract the piston 71.

The sealing cup 87 is capable of preventing leakage from the chamber 88 for an indefinite period of time, but it will be understood that various other seals may also be used. The expansible and contractible chamber 88, for example, might be lined with a flexible and collapsible elastic impervious bag or the like, the interior of which communicates with the interior of the sealing tube 16.

Although a casket incorporating the hydraulic pump 40a may be rendered theft-proof, for example by employing the theft-proof latches of Figs. 1 to 9 and by rounding the recess 97 with a drill or otherwise making it difficult to rotate the screw 81, such casket preferably should be of a type which can easily be opened by authorized persons after the casket has been sealed for shipping a corpse or for other reasons. It is therefore preferable to replace the theft-proof locking mechanisms 21 with conventional latches where the pump 40a is employed and it is desired to open the casket after it has been sealed.

However, by properly designing the locking bolts 22 and the keepers 23, the casket may be opened after a medium sealing pressure is applied. For example, by providing a material at 38 of the proper hardness, it is possible to provide a casket which may be sealed by advancing the piston of the pump 40a a predetermined distance to obtain a medium sealing pressure insufficient to substantially deform the material 38, which may thereafter be opened by retracting the piston, and which may be permanently sealed by advancing the piston a greater amount to obtain a higher sealing pressure sufficient to deform the material 38 and to prevent subsequent opening of the casket.

It will be apparent from Figs. 17 and 18 that the casket shown therein has a body and lids substantially the same as those shown in Figs. 1 to 9 but that different flanges are provided for holding the upholstery. As shown, the casket body and the lids are the same as those of the first-mentioned casket except that the marginal flanges receiving the wooden strips 64 and 65 are replaced by continuous marginal flanges 100 and 101, respectively.

The sheet of material forming the molding 5 and the marginal channel 8 extends inwardly beyond each side wall 1 and each end wall 2 to form the flange 101 which extends throughout the periphery of the casket. The sheet material forming the lids 9 and 10 likewise forms the flange 100 which is above and coextensive with the flange 101 when the lids are closed. The flange 100 is shaped the same as the flange 101 but is pointed in the opposite direction as shown in Fig. 17.

The flange 101 extends a short distance horizontally and is turned toward the bottom wall 3 of the casket to provide a continuous marginal channel 102 preferably of substantially uniform cross section throughout its length and extending throughout the upper periphery of the receptacle formed by the casket walls 1, 2, and 3 at the upper edge thereof. The portion of the flange 101 adjacent its outer edge 103 is bent outwardly toward the casket wall so as to provide a restricted entrance 104. The distance from the edge 103 to the casket wall and the width of the entrance 104 is less than the largest internal diameter of the marginal channel 101 throughout the length of said channel.

A continuous hollow tube 105 of elastic and pliable rubber-like material and of a size to fit in the channel 102 may be inserted into the channel and will be held against movement out of the channel by the edge 103. As herein shown, the flanges 100 and 101 containing the tubes 105 are arcuately curved in cross section and are substantially semi-cylindrical, and each tube 105 is circular in cross-section and has an external diameter greater than the width of the entrance 104 so that it must be compressed to pass through such entrance.

Suitable upholstery or other decorative material may be attached to the tube 105 so as to be supported and held in place by the flange 100 or 101. As herein shown, the casket is provided with upholstery 106 of conventional type having thin sheets 107 and 108 of woven fabric or other suitable material forming the opposite outer surfaces of the upholstery. These sheets engage each other at the tube 105 and are wrapped around the tube and attached thereto by stitching 109. The tube 105 and the two sheets 107 and 108 are adapted to fit tightly in the marginal channel 102 throughout the length thereof as indicated in Figs. 17 and 18 and have a combined diameter when removed from the channel substantially equal to the maximum diameter of the channel. The width of the narrow entrance 104 to the marginal channel is sufficient to permit movement therethrough of the tube 105 and the sheets attached thereto when the tube is compressed radially but is sufficiently small so that the upholstery is firmly held in place when the tube is in the channel 102. It will be understood that only one of the two sheets 107 and 108 need be wrapped around the tube 105 satisfactorily to attach said tube to the upholstery.

It will be understood that, in accordance with the patent statutes, variations and modifications of the specific devices disclosed herein may be made without departing from the spirit of the present invention.

Having described my invention, I claim:

1. In a casket having upstanding side and end walls and a bottom wall forming an elongated generally rectangular receptacle, a continuous marginal channel in the upper surface of said receptacle extending throughout its periphery, a continuous flexible and dilatable liquid-including sealing tube in said channel and extending throughout the length thereof, a rectangular lid engageable with said sealing tube to provide an air-tight seal for said casket, means to hold said lid against said sealing tube, means in said receptacle for increasing the amount of liquid in said sealing tube and the liquid pressure therein and for maintaining the increased liquid pressure including a reservoir for gas and liquid under pressure connected to said sealing tube and means accessible from outside said casket for controlling said last-named means.

2. A casket having a main generally rectangular body portion providing a rectangular enclosure and a lid hinged to said body portion, a hollow continuous pliable dilatable liquid-including rubber-like sealing tube engaging said lid throughout the periphery thereof and engaging the upper marginal edge of said body portion, said tube being adapted to expand under increased liquid pressure and to be compressed against said lid and said body portion to provide an air-tight seal for said casket, means accessible from outside said casket for increasing the amount of liquid in said tube and the liquid pressure thereof, means for maintaining the increased liquid pressure comprising a tank in said casket having said liquid therein and having a gas trapped above said liquid, said gas being under pressure to maintain a sealing pressure on the liquid in said sealing tube, and a conduit extending from said sealing tube to said tank and terminating adjacent the bottom of said tank below the level of said liquid.

3. A casket as defined in claim 2 wherein said tank before sealing of the casket contains sufficient liquid to fill the sealing tube and to apply said sealing pressure and contains compressed gas under an initial pressure considerably higher than said sealing pressure and wherein valve means is provided to prevent flow of liquid from said tank to said sealing tube and to maintain said initial pressure compressing said gas until it is desired to seal the casket, said means accessible from outside the casket including actuating means for operating said valve means to permit said flow of liquid whereby the compressed gas forces the liquid from the tank into the sealing tube and maintains sufficient pressure thereon to provide an air-tight seal for said casket.

4. A theft-proof casket having a body portion and a lid hinged to said body portion, a continuous dilatable liquid-including sealing tube engageable with said lid and said body portion throughout the periphery thereof for applying a uniform pressure between said lid and said body portion, locking means for limiting movement of said lid away from said body portion including a bolt and a keeper for receiving said bolt, frangible means accessible from outside said casket for moving the bolt into the keeper, means in said casket for increasing the liquid pressure within said sealing tube so as to move the lid away from the body portion the limited distance permitted by said locking means and to apply a pressure between the bolt and its keeper, said last-mentioned pressure preventing movement of said bolt out of said keeper by said frangible means, said frangible means becoming inoperative when subjected from outside the casket to a force approaching that necessary to move the bolt out of the keeper, and means accessible from outside said casket for controlling the liquid pressure-increase means.

5. A casket as defined in claim 4 wherein accumulator means are provided for maintaining said pressure comprising an expansion tank, said bolt having a notch therein for receiving a portion of said keeper, said notch being filled with a soft deformable material.

6. A casket as defined in claim 4 wherein accumulator means are provided for maintaining said pressure comprising an expansion tank, said tank receiving the liquid and having gas trapped above the liquid.

7. A casket having a main body portion and a lid hinged to said body portion, a hollow flexible and dilatable liquid-including sealing tube extending throughout the periphery of said body portion and engageable with said lid, said tube when subjected to internal fluid pressure being compressed against said lid and said body portion to provide an air-tight seal for the casket, means in said casket for increasing the amount of liquid in said sealing tube and for maintaining a sealing pressure on said liquid comprising an expansion tank, a pump having a cylinder, and a piston slidably mounted in said cylinder, said tank being in fluid communication with said sealing tube, and means accessible from outside said casket for operating said pump and for holding said piston in adjusted positions with respect to said cylinder.

8. A casket having a main generally rectangular body portion providing a rectangular enclosure and a lid hinged to said body portion, a hollow continuous pliable dilatable liquid including rubber-like sealing tube engaging said lid throughout the periphery thereof and engaging the upper marginal edge of said body portion, said tube being adapted to expand under increased liquid pressure and to be compressed against said lid and said body portion to provide an air-tight seal for said casket, means for maintaining the increased liquid pressure comprising a tank in said casket having said liquid therein and having a gas trapped above said liquid, said gas being under pressure to maintain a sealing pressure on the liquid in said sealing tube, and a conduit extending from said sealing tube to said tank and terminating adjacent the bottom of said tank below the level of said liquid, conduit means being provided to supply liquid under pressure to said sealing tube including a non-return valve and an inlet connection accessible from outside said casket, said casket being sealed by supplying liquid under pressure through said non-return valve to the interior of said sealing tube and said tank so as to compress the gas in said tank.

9. A casket having upstanding side and end walls and a bottom wall forming a generally rectangular receptacle, a continuous marginal channel in the upper surface of said receptacle extending throughout its periphery, a pliable and dilatable liquid including sealing tube in said channel and extending throughout the length thereof, a sectional lid including two independently movable rectangular closure members engageable with said sealing tube to provide an air-tight seal for said casket, each of said closure members being hinged to one of the side walls, locking means on the other of said side walls for limiting movement of said lid away from said receptacle to hold the lid in closed position closely overlying and in engagement with said sealing tube, a hollow tubular sealing member between and engaging abutting faces of said closure members, and means including a pressurizable liquid reservoir in said casket communicating with said sealing tube and said sealing member for increasing the amount of liquid in said sealing tube and the pressure thereof and for maintaining said pressure so as to prevent entry of air into the interior of said casket below and between said closure members and means accessible from outside said casket for controlling said last-named means, the means for maintaining pressure on said liquid comprising a reservoir for gas under pressure communicating with the interiors of said sealing tube and said sealing member.

10. A casket having upstanding side and end walls and a bottom wall forming a body portion that provides an elongated generally rectangular enclosure, means providing a continuous marginal channel in the upper surface of said body portion extending throughout its periphery, a continuous flexible and dilatable liquid-including sealing tube in said channel and extending throughout the length thereof, means for closing the casket including at least one generally rectangular lid hinged to said body portion and engageable with said sealing tube to provide an air-tight seal for said casket, means to hold said lid against said sealing tube, means in said casket for increasing the amount of liquid in said tube and the sealing pressure thereof comprising a pump and means accessible from outside the casket for causing operation of said pump, and yieldable means comprising an accumulator spaced from said tube and in fluid communication therewith for maintaining the sealing pressure on said liquid.

11. A casket having a main generally rectangular body providing a rectangular enclosure and at least one lid hinged to said body, a hollow continuous dilatable liquid-including rubber-like sealing tube engaging said lid near the periphery thereof and engaging the upper marginal portion of said body, said tube being constructed to be compressed by liquid pressure against said lid and said body to provide an air-tight seal for said casket, and means accessible from outside the casket for increasing the amount of liquid in said tube and the liquid pressure in said tube including yieldable means in said casket spaced from and communicating with said tube for maintaining the increased pressure on said liquid while permitting changes in the volume or weight of liquid in said tube, said yieldable means including a reservoir containing a gas under pressure.

References Cited in the file of this patent

UNITED STATES PATENTS

| | | |
|---|---|---|
| 500,809 | Lakin | July 4, 1893 |
| 534,166 | Louden et al. | Feb. 12, 1895 |
| 1,005,547 | Hollister | Oct. 10, 1911 |
| 2,527,084 | Smith | Oct. 24, 1950 |
| 2,533,828 | McEwan | Dec. 12, 1950 |